Patented June 26, 1951

2,558,665

UNITED STATES PATENT OFFICE 2,558,665

MOISTURE SETTING PAINT

Albin K. Schoepf, New York, N. Y., assignor to Sun Chemical Corporation, New York, N. Y., a corporation of Delaware No Drawing. Application May 7, 1947,
Serial No. 746,635

3 Claims. (Cl. 260—33.2)

This invention relates to paint materials, and more particularly to paint materials which are useful under all normally encountered conditions of humidity.

It is an object of the present invention to provide a paint material of such nature that upon application, rapid drying of the paint film is obtained under all conditions of humidity.

Another object of the present invention is to provide a paint material of such nature that the setting of the paint film can be hastened by addition of water, for example, steam or vapor, to the applied films.

Another object of the present invention is to provide a paint material of such nature that setting of the film will occur under all conditions of humidity with sufficient rapidity, so that the film will dry in a substantially dust-free condition.

Another object of the present invention is to provide a paint material with the characteristics above described and of such nature that it is substantially odorless.

Other objects of the present invention will be apparent from the description and appended claims.

According to the present invention, I have found that paint materials can be prepared which are extremely rapid in their drying characteristics and which are substantially odorless, and also have the important and extremely useful characteristic of drying rapidly under all normally encountered conditions of relative humidity. The ability of the paint materials of the present invention to set or dry under all normally encountered relative humidity conditions is an extremely important and valuable property. For example, these paint materials can be employed for application on days when the weather conditions normally would preclude painting with ordinary and hitherto available drying oil paints. As a matter of fact, these new paint materials dry with substantially the same rapidity under high relative humidity conditions as when the relative humidity is somewhat lower. Thus, these paint materials will dry substantially as rapidly when the relative humidity of the atmosphere in which the paint film has been applied is above 50%, as when the relative humidity is below this figure.

This characteristic of extremely rapid drying under high relative humidity conditions which, stated in other words, indicates rapid drying in atmospheres containing a relatively large quantity of atmospheric moisture, can be utilized to increase the speed of setting of the paint film. For example, the paint film can be sprayed with steam or water, and upon such treatment, point films prepared from the paints of the present invention will set almost immediately to give a relatively hard, dry film. The latter at this point is not sufficiently strong to withstand every rubbing or smearing operation to which it will be subjected in use, but is sufficiently dry or set so that it can be touched lightly or rubbed gently without fear of smearing. Such characteristics are extremely important in interior painting where frequently it is desired to return furniture to a painted room as quickly as possible after completion of the painting operation. In redecorating hotel rooms, for example, it is desirable to be able to have the room available for occupancy on the same day on which it is painted. With the paint materials of the present invention this can readily be done; in addition, the painting can be done without regard to atmospheric humidity conditions, as described above.

As a consequence of the initial rapid hardening or drying of the paint films of the present invention, as above described, I have found that the dried paint film is substantially dust-free. Hitherto, freshly painted surfaces which were exposed to the atmosphere tended to pick up dust and other particles from the surrounding atmosphere during the drying operations, and while the paint film was still in a wet or tacky condition. The presence of such extraneous particles in the dried paint film is objectionable since it detracts particularly from the appearance of the painted material. Also the paint film frequently is uneven because of the presence of these materials. With the paint film of the present invention, however, sufficiently rapid initial drying and setting is secured so that the paint film rapidly passes through the wet, tacky stage to a condition where it is sufficiently hard and dry, as above set forth, that it will no longer pick up such extraneous particles during the remainder of the setting period.

In preparing the paint materials of the present invention, the binding materials employed to bind the pigment to the base to be painted are selected from a group of materials which are solid or semi-solid in character, and which are immiscible with water. In addition to the above water immiscible characteristics, the binding materials of the present invention have the characteristic of miscibility with solvents, which solvents are themselves miscible with water. The liquid solvent materials employed in the new paints are water miscible, as mentioned above. In addition, these materials have evaporation characteristics such that the paints are stable in the can and before application, but upon application upon a base material, rapidly leave the paint film either by evaporation into the air or by absorption into the base material, or by a combination of both phenomena.

In preparing vehicles for the paints of the present invention, the binder material and solvent material are admixed either in the cold or warm until the binder material is dispersed or dissolved in the solvent. In this connection it is noted that a solvent material need not be a single pure chemical, but can comprise a mixture of materials of the characteristics set out above. In addition, in some instances, it may be desirable to have a portion of the solvent material of such nature that it is not miscible with water. Where the amount of water immiscible material is sufficiently low, the setting characteristics of the paint film will not be impaired. In many instances, however, the can stability characteristics of the paint material may be improved by the presence therein of a portion of water immiscible solvent material.

In preparing the finished paint material, pigments are incorporated in the vehicle materials, which latter are satisfactorily prepared as above described. The method of incorporation satisfactorily is that ordinarily employed in the preparation of analogous materials. For example, the materials may be admixed by a milling operation in a ball mill or roller mill or the like to effect dispersion of the pigment material in the vehicle. Where solid or semi-solid binding materials are employed, in which the final film formation is effected through an oxidation mechanism, driers may be incorporated to hasten such final film formation. Likewise, other materials such as flattening agents and the like, normally employed to secure particular characteristics with regard to reflection characteristics, may be incorporated.

Illustrative of a practical commercial formulation of the paint materials of the present invention, the following example is given. As is well understood by those skilled in this art, the amount and kind of pigment may be varied as is customarily done in the paint industry. Similarly, as mentioned above, additional materials may be incorporated to secure particular effects.

*Example 1*

| | |
|---|---|
| Titanium dioxide pigment | 6.2 |
| Lithopone pigment | 40.0 |
| Corn protein | 1.9 |
| Ethylene glycol soluble rosin modified phenol-formaldehyde condensate | 9.0 |
| Treated linseed oil | 2.0 |
| Ethylene glycol | 35.7 |
| Butyl cellosolve (ethylene glycol mono-butyl ether) | 4.8 |
| Mineral spirits | 0.4 |
| | 100.0 |

Because of the nature of the materials employed in the paint materials of my invention, such as are illustrated by Example 1 above, the paint material is substantially free from objectionable odors. The materials employed are either odorless or possess a very slight and not at all unpleasant odor. Because of this feature, these paint materials can be used satisfactorily in interior painting, without fear of objectionable odors arising, such as frequently are encountered with well known and hitherto commercially available drying oil paints. This characteristic is extremely important where it is desirable that the rooms reoccupied as quickly as possible upon completion of the painting operation without possible discomfort to the occupants.

The above described paint material, which is of a brushing consistency, was applied over unpainted wood and also over painted surfaces. In all instances, the paint film sets up in about twenty minutes under normal relative humidity conditions of the order of about 50% relative humidity. When the relative humidity is higher than 50%, setting of the paint film occurs in somewhat less time. If desired, the speed of setting of the above paint material may be decreased to about five minutes, by treating the painted films with a jet of steam.

The paint films above described are still somewhat soft at this point, and can be marred by sufficiently severe rubbing or smearing. However, the paint film is dry, so that relatively light touching or rubbing will result in no transfer of the paint material to the object with which the rubbing operation is done. The above paint film, after this initial setting operation, subsequently continues to set, and at the end of twenty-four hours, the paint films are completely rub-proof, and after twenty-nine hours, are sufficiently hard so that they will not rub off upon washing with a wet cloth. Also, during this setting period the resistance of the paint film to marring surfaces increases, so that at the end of the period above set forth, a final paint film of relatively great scratch and mar resistance is secured.

Also, in certain instances, paints may be made according to the present invention in which one of the constituents of the paint material is a limited amount of water. It has been found, according to the present invention, that paint materials may be prepared which show satisfactory stability before application, for example, in containers upon storage, and which contain therein a predetermined proportion of water. Paints of this kind have been found to be particularly useful in applications to surfaces under conditions of low relative humidity, for example, relative humidity below 50% at normally encountered room temperatures. Illustrative of such paints of the present invention are the following examples.

*Example 2*

A vehicle is prepared containing the following ingredients:

| | Parts by weight |
|---|---|
| Glycol soluble rosin-modified phenol-formaldehyde condensate | 35.0 |
| Corn portein | 10.0 |
| Solid polyglycol | 5.0 |
| Ethyl ether of ethylene glycol | 50.0 |
| | 100.0 |

This mixture of materials is heated at temperatures within the range of 210-220° F. until the mixture is homogeneous. The solid polyglycol employed is Carbowax 1500, sold by the Carbide & Carbon Chemicals Corporation.

A paint is then prepared, according to normal well-known procedure used in the paint industry containing:

| | Parts by weight |
|---|---|
| Vehicle of Example 2 | 36.4 |
| Lithopone pigment | 36.4 |
| Titanium dioxide pigment | 5.4 |
| Water | 9.1 |
| Ethyl ether of ethylene glycol | 12.7 |
| | 100.0 |

The paint material prepared as described in this example when applied to bare sandpapered wooden surfaces at normally encountered room temperature and 30% relative humidity is dry to touch in 40 minutes and completely hard and wash-proof in less than 24 hours. Under the same temperature conditions, but at a relative humidity of 80% the paint is dry to touch in 58 minutes, and completely hard and wash-proof in less than 24 hours. Under both relative humidity conditions the paint is sufficiently hard in approximately 4 hours to permit application of a second coat; and also to permit rather severe handling without marring or rubbing.

*Example 3*

| | Parts by weight |
|---|---|
| Rosin-maleic anhydride adduct resin | 35.0 |
| Ethyl ether of ethylene glycol | 50.0 |
| Corn protein | 10.0 |
| Solid polyglycol | 5.0 |
| | 100.0 |

In preparing this vehicle, the first two ingredients are admixed and heated at 270-280° F. until the admixture is homogeneous. The mixture then is allowed to cool to 240° F. and there is added, under agitation conditions, the corn protein and solid polyglycol.

Utilizing this vehicle, a paint is prepared containing:

| | Parts by weight |
|---|---|
| Vehicle of Example 3 | 37.2 |
| Lithopone pigment | 37.2 |
| Titanium dioxide pigment | 5.6 |
| Water | 9.3 |
| Ethyl ether of ethylene glycol | 10.7 |
| | 100.0 |

This paint, when applied to bare sandpapered wooden surfaces at normally encountered room temperatures and relative humidity of 30%, is dry to touch in 50 minutes, sufficiently hard to permit application of a second coat and rather severe handling in 4 hours, and thoroughly hard and wash-proof in less than 24 hours. Under the same temperature conditions and a relative humidity of 80%, the paint is dry to touch in 70 minutes, sufficiently hard and rub-resistant to permit application of a second coat and rather severe handling in 5 hours, and completely hard and wash-proof in less than 24 hours.

The reasons why the paint materials of the present invention have the outstanding characteristics described are not completely understood at the present time. One theory which may explain the unusually rapid setting of the paint materials under high relative humidity conditions is that because of the water miscibility of the binder material, when an excess of water is present, sufficient water will be absorbed into the paint to effect dilution of the solvent material with water with consequent precipitation of the binder material. Because of the immiscibility of the binder material with water, such binder-solvent systems as are employed in the point materials of the present invention can tolerate only a certain definite quantity of water absorbed into such systems. When this amount of water is exceeded, the binder material is precipitated from the mixture. Thus, it may be that under high relative humidity conditions, sufficient moisture is absorbed into the paint film so that the amount of water present in the paint film is greater than the tolerance of this particular material for water. If this condition occurs, precipitation of the binder material will be effected. And the binder material, upon precipitation, will carry with it the coloring materials present in the paint. When the relative humidity is sufficiently low, and when no extraneous source of water is employed to increase the speed of setting of the film, the paint films from the paint materials of the present invention will set initially, principally through the evaporation of the solvent material, or absorption of the solvent material into the base which has been painted. By choosing a solvent material with proper evaporation characteristics, as above described, paint materials are secured of such nature that films thereof will dry rapidly upon application, under all relative humidity conditions.

As described in Examples 2 and 3, paints of the present invention may contain a predetermined limited quantity of water in the paint formulation without objectionably affecting the stability of the paint upon storage prior to application. The paints of the present invention have vehicle constituents of such nature that they remain stable in the presence of a limited amount of water, but separation of the binder constituents from the vehicle may be brought about by adding to the paint a large excess of water. For this reason, such paint formulations as are set forth in Examples 2 and 3, may be utilized for application under conditions of both high and low relative humidity at normally encountered room temperatures without objectionable change in the nature of the paint material before and during application. When application to a surface has been effected, it may be that final setting of the paint film is caused by the taking up of additional moisture until an excess of water is present in the paint film beyond that which the paint will tolerate without precipitation of the binder material. When such condition occurs, the binder and pigment separate rapidly and readily from the liquid constituents and form a hard non-marring surface. Where desired, the speed of the setting process of the paint film may be increased by spraying the painted surface with water, steam, or the like.

One satisfactory method of determining the amount of water which may be added to the paints of the present invention is by a dilution or tolerance test in which the amount of water which may be added to the paints of the present invention before precipitation of the binder constituent occurs is determined. Using such test, for example, with the vehicles of Examples 2 and 3, each of the vehicles will tolerate addition of 48 parts by weight of water to 100 parts by weight of vehicle before permanent precipitation of the binder constituents occurs.

But, whatever the theory, the paint materials of the present invention possess the extremely important and useful characteristics of rapid setting under all normally encountered humidity conditions, freedom from odor, and ability to dry to a dust-free condition above set forth.

While the above products herein described and processes of making these products constitute preferred embodiments of the invention, it will be understood that changes may be made therein without departing from the scope of the invention, as defined in the appended claims.

What is claimed is:

1. A paint material comprising coloring material and a vehicle component, said vehicle component comprising a glycol-soluble phenol-formaldehyde resin and a liquid component which is miscible with water and which is a solvent for said resin, said liquid component comprising a material selected from the group consisting of ethylene glycol and the mono-ethyl ether of ethylene glycol and mixtures thereof, said vehicle having a water tolerance of up to 48 parts by weight of water per 100 parts by weight of said vehicle, said paint having the character of rapid setting under all normal relative humidity conditions.

2. A paint material comprising coloring material and a vehicle component, said vehicle component comprising a glycol-soluble phenol-formaldehyde resin and ethylene glycol, said vehicle having a water tolerance of up to 48 parts by weight of water per 100 parts by weight of said vehicle, said paint having the character of rapid setting under all normal relative humidity conditions.

3. A paint material comprising coloring material and a vehicle component, said vehicle component comprising a glycol-soluble phenol-formaldehyde resin and the mono-ethyl ether of ethylene glycol, said vehicle having a water tolerance of up to 48 parts by weight of water per 100 parts by weight of said vehicle, said paint having the character of rapid setting under all normal relative humidity conditions.

ALBIN K. SCHOEPF.

REFERENCES CITED

The following references are of record in the file of this patent:

UNITED STATES PATENTS

| Number | Name | Date |
| --- | --- | --- |
| 2,236,521 | Coleman | Apr. 1, 1941 |
| 2,285,183 | Bernardi | June 2, 1942 |
| 2,300,881 | Erickson et al. | Nov. 3, 1942 |
| 2,436,954 | Denton | Mar. 2, 1948 |